US009053374B2

(12) United States Patent
Partington et al.

(10) Patent No.: US 9,053,374 B2
(45) Date of Patent: Jun. 9, 2015

(54) BIOMETRIC TRAINING AND MATCHING ENGINE (71) Applicant: Accenture Global Services Limited, Dublin (IE)

(72) Inventors: Alastair Ross Partington, Hatfield (GB); Jordi Rocamora Marti, Antibes (FR); Sebastiano Tornesello, Juan les Pins (FR)

(73) Assignee: Accenture Global Services Limited, Dublin (IE)

(*) Notice: Subject to any disclaimer, the term of this patent is extended or adjusted under 35 U.S.C. 154(b) by 315 days.

(21) Appl. No.: 13/644,090

(22) Filed: Oct. 3, 2012

(65) Prior Publication Data

US 2013/0083975 A1 Apr. 4, 2013

(30) Foreign Application Priority Data

Oct. 3, 2011 (EP) .................................... 11306280

(51) Int. Cl.
*G06K 9/00* (2006.01)
*G06F 17/30* (2006.01)

(52) U.S. Cl.
CPC ........ *G06K 9/00973* (2013.01); *G06K 9/00926* (2013.01); *G06F 17/30979* (2013.01)

(58) Field of Classification Search
USPC ............. 382/115–127; 340/5.8–5.86; 356/71; 713/186; 902/3
See application file for complete search history.

(56) References Cited

U.S. PATENT DOCUMENTS

| 5,224,173 | A | 6/1993 | Kuhns |
| 7,606,396 | B2 * | 10/2009 | Miller et al. .................. 382/116 |
| 8,832,124 | B2 * | 9/2014 | Partington et al. ............ 707/754 |
| 2005/0238214 | A1 | 10/2005 | Matsuda |
| 2006/0104485 | A1 | 5/2006 | Miller, Jr. |
| 2007/0195999 | A1 * | 8/2007 | Willis ........................... 382/115 |
| 2011/0211735 | A1 * | 9/2011 | Langley ........................ 382/115 |
| 2012/0319817 | A1 * | 12/2012 | Abe ............................. 340/5.82 |
| 2013/0086090 | A1 * | 4/2013 | Partington et al. ............ 707/754 |
| 2013/0093565 | A1 * | 4/2013 | Partington et al. ........... 340/5.82 |

OTHER PUBLICATIONS

Hiromoto et al., "Partially Parallel Architecture for AdaBoost-Based Detection With Haar-Like Features," IEEE Transactions on Circuits and Systems for Video technology, vol. 19, No. 1, Jan. 2009, pp. 41-52.

(Continued)

*Primary Examiner* — Aaron W Carter
(74) *Attorney, Agent, or Firm* — Harrity & Harrity, LLP (57) ABSTRACT The present disclosure concerns a method of identifying a biometric record of an individual in a database (108) having a plurality of biometric records, the method involving: during a training phase: applying by a processing device a matching operation to determine scores for a similarity between at least one training biometric sample of each of a plurality of training records and at least one probe sample; based on said scores, determining a threshold value ($S_{TH}, M_{TH}$); and during an identification phase: evaluating at least one reference biometric sample of each of the records of said database to determine a parameter value for each record; selecting a subset of said records by comparing each of said parameter values with said threshold value; and applying a matching operation to the selected records to determine whether an input biometric sample matches a reference biometric sample of one of said selected records.

20 Claims, 4 Drawing Sheets (56) References Cited

OTHER PUBLICATIONS

European Search Report issued in EP11306279 on Mar. 16, 2012.
European Search Report issued in EP 1130 6280 on Mar. 22, 2012.
European Search Report issued in EP1130 6347 on Jan. 30, 2012.
Hong, L., et al., "Integrating faces and fingerprints for personal identification", IEEE Transactions on Pattern Analysis and Machine Intelligence, IEEE Service Center, Los Alamitos, CA, US, vol. 20, No. 12, (Dec. 1, 1998), pp. 1295-1307.
Jain, L.C. (Ed), et al., "Chapter 2 (part): Fingerprint Feature Processing Techniques and Poroscopy in: Intelligent Biometric Techniques in Fingerprint and Face Recognition", (Jan. 1, 1999), Intelligent Biometric Techniques in Fingerprint and Face Recognition, Boca Raton, FL, CRC Press, US, pp. 56-60.
Jain, A.K., et al.,: "Handbook of Biometrics", 2008, Springer Science, New York, US, pp. 12-14.
Jain, A.K. et al.: "Biometrics: Personal Identification in Networked Society", 1999, Kluwer Academic Press, Norwell, US, pp. 18-20, 60-61, 51.

* cited by examiner

| ID | FACE PHOTO | Q1 | Q2 | θ | FINGER PRINT | Q1 | Q2 | IRIS SCAN | Q1 | Q2 | SIGNATURE | Q1 | Q2 |
|---|---|---|---|---|---|---|---|---|---|---|---|---|---|
| ID1 | image 1A | 9 | 2K | 5° | image 1B | 5 | 320 | image 1C | 8 | 640 | image 1D | 4 | 320 |
| ID2 | image 2A | 5 | 1K | 0° | ——— | — | — | image 2C | 9 | 640 | image 2D | 7 | 180 |
| ID3 | image 3A | 6 | 1K | -10° | image 3B | 7 | 780 | ——— | — | — | image 3D | 5 | 480 |

| 602 | 604 | 606 | 608 | 610 | 612 | 614 | 616 |
|---|---|---|---|---|---|---|---|
| PROBE ID | RECORD ID | OP1 | OP2 | Q1 PROBE | Q1 RECORD | Q2 RECORD | $\theta_{PROBE} - \theta_{RECORD}$ |
| PB1 | ID1 | 20 | 10 | 7 | 9 | 2K | 0° |
| PB1 | ID2 | 45 | 20 | 7 | 5 | 1K | 5° |
| PB1 | ID3 | 42 | 85 | 7 | 6 | 1K | 15° |

DMSE Training Application

Strategy 1
Analysis order: Fingerprint, Iris, Face — % of records 33%
Quality Thresold: 1008 — 40
Pre-Filter value: 1010 — -80

Predicted accuracy for strategy

| FM: | FNM: | TM: | TNM: |
|---|---|---|---|
| 90% | 10% | 90% | 10% |

Expected Throghput  15 Transactions/second  1016

Remove Strategy

Strategy 2
Analysis order: Iris, Face, Fingerprint — % of records 40%
Quality Thresold: 1008 — 30
Pre-Filter value: 1010 — -80

Predicted accuracy for strategy

| FM: | FNM: | TM: | TNM: |
|---|---|---|---|
| 90% | 10% | 90% | 10% |

Expected Throghput  10 Transactions/second  1016

Remove Strategy

Add Strategy...  1020

System performance

Predicted system accuracy

| FM: | FNM: | TM: | TNM: |
|---|---|---|---|
| 90% | 10% | 90% | 10% |

Expected Throghput  13 Transactions/second  1024

Export DMS Config...

Fig 10

BIOMETRIC TRAINING AND MATCHING ENGINE

The present application is related to co-pending U.S. patent application Ser. No. 13/644,056 entitled BIOMETRIC MATCHING ENGINE and Ser. No. 13/644,117 BIOMETRIC MATCHING SYSTEM, both of which are filed on even data herewith.

FIELD

The present disclosure relates to training a biometric matching system for identifying a record in a biometric database based on an input biometric sample.

BACKGROUND

The use of biometric data for the identification of individuals is increasingly becoming the preferred choice in many environments due to the relative difficulty in fraudulently replicating the data. For example, due to increasing fraud involving payment cards such as credit cards, it has been proposed to use biometric data, such as for example fingerprints, to identify customers in shops or supermarkets to allow a payment transaction to be initiated. As a further example, biometric data is increasing used for identifying individuals authorized to enter restricted areas, such as gyms, apartment blocks or vehicles. Furthermore, criminal databases have long been used for identifying individuals based on biometric data, such as a fingerprint or facial image taken at a crime scene.

To identify individuals, a biometric sample is obtained and compared to the records of a database, until a match is found. In the majority of applications, speed is of the essence. For example, if a user is at the checkout of a supermarket, or at the entrance of an apartment block, an identification delay of more than several seconds may be considered unacceptable. A further requirement is that there are very few errors, i.e. very few false positive and false negative results. Indeed, if a customer at the checkout of a supermarket can not be identified, or is wrongly identified, this could lead to the customer being unable to make the payment, or to the wrong person being billed.

However, there is at least one technical problem in increasing the speed of identification and/or in reducing the error rate in current biometric identification systems.

SUMMARY

It is an aim of embodiments of the present disclosure to at least partially address one or more problems in the prior art.

According to one aspect, there is provided a method of identifying a biometric record of an individual in a database, the database comprising a plurality of biometric records, the method comprising: during a training phase: applying by a processing device a matching operation to determine scores for a similarity between at least one training biometric sample of each of a plurality of training records and at least one probe sample; based on said scores, determining by said processing device a threshold value; and during an identification phase: evaluating at least one reference biometric sample of each of the records of said database to determine a parameter value for each record; selecting a subset of said records by comparing each of said parameter values with said threshold value; and applying a matching operation to the selected records to determine whether an input biometric sample matches a reference biometric sample of one of said selected records.

According to one embodiment, said threshold value is determined by said processing device by evaluating a correlation between said scores and at least one parameter value of each record.

According to another embodiment, a plurality of parameter values are evaluated for each record, and said training phase further comprises selecting which of the plurality of parameter values is to be compared with said threshold value.

According to another embodiment, said training phase comprises evaluating said at least one training biometric sample of each training record to determine a value of said parameter for each training record, said threshold value being determined as a parameter value that allows known matching and non-matching samples to be separated.

According to another embodiment, said parameter provides a quality indication of said sample.

According to another embodiment, said parameter is based on either: the age of the individual of the biometric sample; or the gender of the individual of the biometric sample; or the sharpness of an image of the biometric sample; or the viewing angle of an image of the biometric sample; or the contrast in an image of the biometric sample; or any combination thereof.

According to another embodiment, selecting a subset of said records comprises creating a first partition of said database comprising said selected records, the method further comprising creating at least one further partition of said database comprising the remaining records of said database.

According to another embodiment, said identifying phase further comprises applying a further matching operation to the records of the at least one further partition of said database to determine whether said input biometric sample matches a reference biometric sample of one of said records of the further partition.

According to another embodiment, said training records each comprise a plurality of training samples of different types from each other, and wherein said training phase further comprises determining, based on said scores, an order that said matching operation is applied to said sample types.

According to another embodiment, said training phase further comprises pseudo-randomly selecting the plurality of training records from among the plurality of biometric records of said database.

According to a further aspect, there is provided a computer readable medium storing a computer program that, when executed by a processor, causes the above method to be implemented.

According to a further aspect, there is provided a biometric matching device comprising: a database storing a plurality of biometric records; a memory storing a plurality of training records, each comprising at least one training biometric sample, and at least one probe sample; and a processor configured to: apply during a training phase a matching operation to determine scores for a similarity between at least one training biometric sample of each of a plurality of training records and at least one probe sample, and based on said scores, determining by said processing device a threshold value; and evaluate during an identification phase at least one reference biometric sample of each of the records of said database to determine a parameter value for each record, select a subset of said records by comparing each of said parameter values with said threshold value; and apply a matching operation to the selected records to determine whether an input biometric sample matches a reference biometric sample of one of said selected records.

According to one embodiment, said processor is configured to determine said threshold value by evaluating a correlation between said scores and at least one parameter value of each record.

According to another embodiment, said processor is further configured to create a first partition of said database comprising said selected records, and to create at least one further partition of said database comprising the remaining records of said database.

According to yet a further aspect, there is provided a biometric matching system comprising: one or more biometric capturing devices for capturing at least one biometric sample of an individual; and the above biometric matching device.

The details of various embodiments are set forth in the accompanying drawings and the description below. Other potential features will become apparent from the description, the drawings and the claims.

BRIEF DESCRIPTION OF THE DRAWINGS

The foregoing and other purposes, features and aspects of the disclosure will become apparent from the following detailed description of example embodiments, given by way of illustration and not limitation with reference to the accompanying drawings, in which.

Throughout the figures, like features have been labelled with like reference numerals.

DETAILED DESCRIPTION

Figure 1:
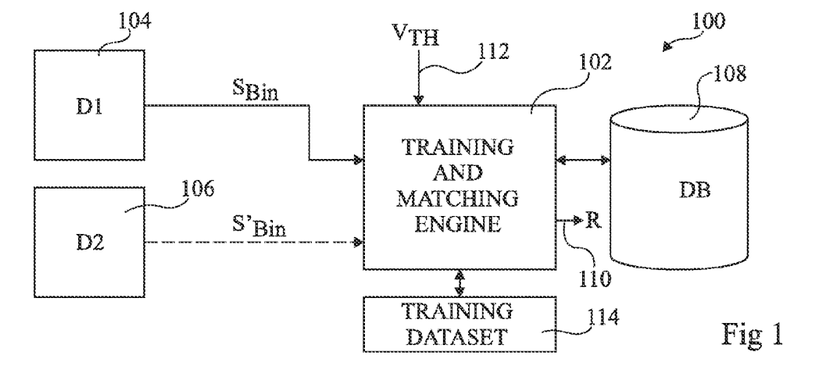
FIG. 1 schematically illustrates a biometric identification system according to an example embodiment.

FIG. 1 illustrates a biometric identification system 100 according to an example embodiment.

System 100 comprises a training and matching engine 102, which receives a biometric input sample $S_{Bin}$ from a capturing device (D1) 104. Engine 102 may also receive a further biometric input sample $S'_{Bin}$ from a further capturing device (D2) 106. The capturing device 104 is for example a visible light or infra-red camera, a fingerprint sensor, microphone or any other detector suitable for capturing a biometric sample of an individual. Input biometric sample $S_{Bin}$ could for example be a photo of the face, a fingerprint, an iris scan, an image of a signature, a finger vein or palm vein image, a voice sample, or any other form of biometric data. Input biometric sample $S'_{Bin}$ is for example also one of this list, but a different one to the sample $S_{Bin}$, such that two types of biometric samples can be used to evaluate a match.

In some cases the individual is present at the capturing device 104 and/or 106 and submits the biometric input sample, for example by presenting their face to a camera or placing a finger on a fingerprint detector. In other cases, the biometric data may be retrieved from another source, such as from the scene of a crime in the case of a fingerprint, or from a surveillance video image.

The training and matching engine 102 receives the one or more biometric input samples from capturing device 104 and/or 106. In particular, the samples $S_{Bin}$ and $S'_{Bin}$ may be digital values transmitted to matching engine 102 via a data connection. Engine 102 could be located next to the capturing devices 104, 106, in which case the data connection could be a USB (universal serial bus) connection, Bluetooth connection, or similar wired connection. Alternatively, the matching engine 102 could be located remotely from the capturing devices 104, 106, and the data connection could be formed of a wired and/or wireless connection comprising a local area network (LAN), a metropolitan data network (MAN), wide area network (WAN) and/or the internet.

Engine 102 has access to a biometric database (DB) 108 storing biometric records each associated with one or more reference biometric samples. Engine 102 searches the biometric database for a record having a reference biometric sample matching the input biometric sample. A result R is provided on an output 110 of the engine 102, and for example simply indicates whether or not a match was found. In alternative embodiments, the result R could contain data associated with the matching record, such as a reference number of the matching record, the identity, such as name of the individual associated with the matching record, or other data.

The process used for identifying a matching biometric record in the biometric database will be referred to herein as a matching process, and may comprise one or more matching operations. A matching operation is one that compares an input biometric sample to at least one reference biometric sample of one or more records in the biometric databases in order to determine a similarity score for each comparison that is used to identify a matching record. Each matching operation is applied to certain records selected based on a threshold value or on a number of such values. As explained in more detail below, the threshold value may be a metadata threshold $M_{TH}$, or a score threshold $S_{TH}$. The threshold value determines the number of records that are to be applied to matching operation, as will be described in more detail below. Thus the threshold value has a direct impact on the accuracy and speed of the matching process. Indeed, the more records that are selected to be applied to a matching operation, the longer this matching operation will take run, but the higher the chance that a matching record will be found.

A training dataset, for example stored in a memory device 114 coupled to engine 102, is used to determine the threshold value or values. The training dataset for example comprises a plurality of training biometric records. In one example embodiment, these training records are pseudo-randomly selected from the records of database 108, i.e. from the actual database used during the matching process. In order to determine the threshold value, matching operations are performed using the training dataset based on one or more probe samples, which are known to match or not match a biometric sample of one of the training records. For example, the probe samples could be samples that were sent to the matching engine 102 from the capturing devices 104, 106 during a past identification request and were matched to a record of the database 108, this match having since been confirmed. For example, the confirmation could come from a user, or at enrolment time duplicate biometric data could have been collected for training purposes.

Figure 2:
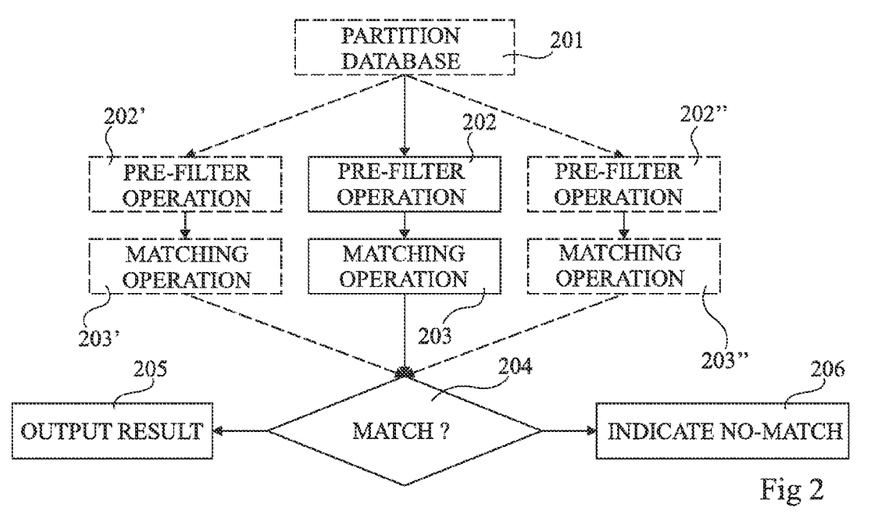
FIG. 2 is a flow diagram illustrating operations in a method of identifying a biometric record according to an example embodiment.

FIG. 2 is a flow diagram illustrating operations in a matching process according to an example embodiment, for identifying a record of database 108 that matches one or more input biometric samples.

In an optional first operation 201, the database is partitioned in to a plurality of partitions. As explained in more detail below, partitioning is used to group together records that have similar characteristics as determined by extracted metadata, for example that have biometric samples of similar quality. The matching operation applied to the records of each partition can then be adapted based on these characteristics. In some embodiments, partitioning is not performed, and the subsequent operation is performed on the entire database 108.

In a subsequent operation 202 a pre-filter operation is performed, for example on all the records of the biometric database 108 if no partitioning has been performed. Alternatively, in the case that the database has been partitioned in operation 201, the pre-filter operation 202 is performed on one of the partitions, and a corresponding pre-filter operation is performed on each of the other partitions, two such operations 202' and 202" being illustrated in FIG. 2 as an example. The pre-filter operations 202, 202', 202" each for example involve performing a fast matching operation on each of the records of the database to provide similarity scores, and based on these scores, the records with relatively low scores that are very unlikely to be matches of the one more input biometric samples are eliminated. The matching operation performed during each pre-filter operation 202, 202', 202" on each of the partitions may be the same or different from each other.

In a subsequent operation 203, a matching operation is applied to the records that were not eliminated by the pre-filter operation 202. Furthermore, in the case that the database was partitioned, a different matching operation is applied to the non-eliminated records of each partition, such operations 203' and 203" being shown in FIG. 2 by way of example. The matching operations for example involve applying cascades of tests to evaluate the similarity of the input biometric sample with a reference biometric sample of each record in turn and provide a similarity score. For example certain patterns in the input and reference samples are compared, or other techniques are used that will be known to those skilled in the art. The input and reference biometric samples compared in this operation may or may not be of the same type as used in the corresponding pre-filtering operations 202, 202', 202". The matching operations 203, 203', 203" are for example chosen to have very few false negative and false positive results, and are thus likely to be relatively slow to execute per record in comparison with the fast matching operations performed in the pre-filtering operations 202, 202', 202".

In a subsequent operation 204, it is determined whether or not a matching record has been identified in operation 203, and, in the case that the database was partitioned, by the matching operations performed on the other partitions, such as operations 203', 203". For example, this may involve comparing the similarity scores generated during the matching operations with a threshold score, and/or selecting the highest scoring record.

After operation 204, if any matching record has been found, the next operation is 205, in which a corresponding result of this matching operation is provided. Alternatively, if no match has been found, this is indicated as an output in an operation 206.

In the case that the database is partitioned in operation 201 of FIG. 2, the threshold value is for example a metadata threshold $M_{TH}$ used to determine which records fall into each partition. In particular, the partitioning of the database is for example performed based on a parameter extracted from each record, referred to herein as metadata, and this parameter is compared to one or more metadata thresholds $M_{TH}$ in order to selectively partition the database.

Additionally or alternatively, the at least one threshold value is a score threshold for eliminating records in the pre-filter operation 202 and optionally 202', 202". In particular, the scores determined by the matching operations are for example compared to the score threshold value $S_{TH}$ in order to select or eliminate each record.

Thus, whatever the form of the threshold value, it has a direct effect on the number of records that are processed by one or more of the matching operation 203, 203', 203".

The particular techniques used in the pre-filter operations 202, 202', 202", and in the matching operations 203, 203', 203" to evaluate the similarity between the input biometric samples and a reference biometric sample of each record will be known to those skilled in the art, and are for example based on cascades of tests. For example, fingerprint and face recognition tests are discussed in the publication "Intelligent Biometric Techniques in Fingerprint and Face Recognition", Jain, L. C. et al. and "Partially Parallel Architecture for Ada-Boost-Based Detection With Haar-like Features", Hiromote et al., the contents of which are hereby incorporated by reference to the extent allowable by the law.

Figure 3:
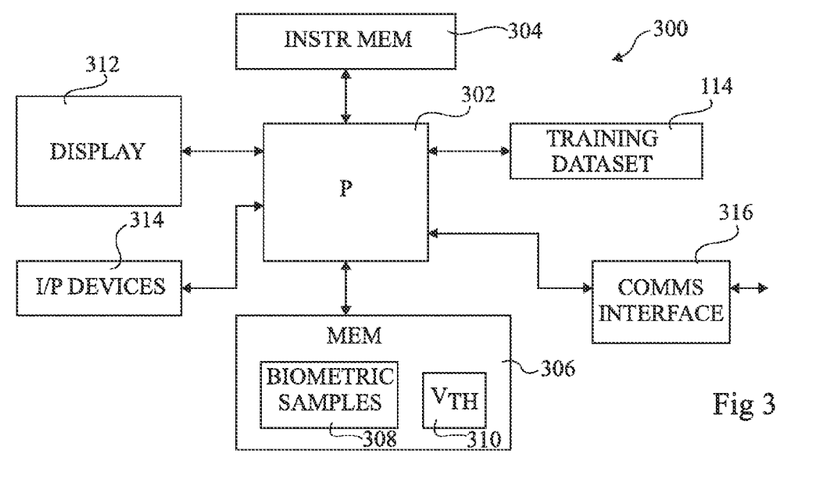
FIG. 3 schematically illustrates an electronic device according to an example embodiment.

FIG. 3 illustrates an apparatus 200 that is suitable for implementing the training and matching engine 102 of FIG. 1 and the method of FIG. 2.

Apparatus 300 for example comprises a processing device 302, which is in communication with an instruction memory 304, a memory device 306 for example having a portion 308 for storing biometric samples, and a portion 310 for storing one or more threshold values $V_{TH}$, a display 312, one or more input devices 314 and a communications interface 316. The processing device 302 is also in communication with the memory 114 of FIG. 1 that stores the training dataset.

The processing device 302 may comprises a microprocessor, microcontroller, digital signal processor, or appropriate combinations thereof, and executes instructions stored in the instruction memory 304, which could be a volatile memory such as DRAM (dynamic random access memory), or another type of memory. In some embodiments, the processing device 302 may comprise a plurality of processors that operate in parallel.

The memory device 306 is for example a non-volatile memory, such as a hard disk drive or FLASH drive. The display 312, as well as one or more input devices 314 such as a keyboard or mouse, may be provided for allowing an administrator to control the operations of the training and matching engine 102, for example to download software updates, etc. The communications interface 316 for example provides a connection to the capturing devices 104, 106, and may be a USB interface, or network interface, for example providing a wired or wireless connection to a communications network such as the internet.

Figure 4:
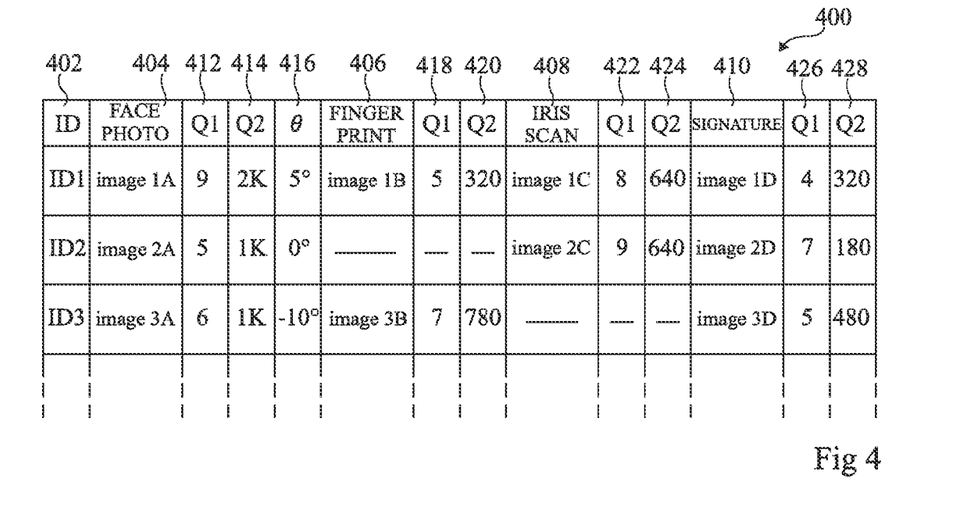
FIG. 4 illustrates a portion of a biometric training database according to an example embodiment.

FIG. 4 illustrates a table 400 corresponding to a portion of the training dataset 114 of FIG. 1, comprising training biometric records according to an example embodiment, each including extracted metadata. The records are for example identical or similar to the records of the biometric database 108. Each row of the table of FIG. 4 corresponds to a training record for a different individual. The record holders of the records will depend on the particular application, but could correspond to members of a gym, employees of an office, or convicted criminals.

In FIG. 4, three biometric records are shown as an example, having reference identifiers "ID1", "ID2" and "ID3" respectively indicated in a field 402. Of course, in practise the database is likely to contain hundreds or thousands of records. Each biometric record is associated with a corresponding record holder, but for security reasons, the database 108 and training dataset 114 for example only identify these individuals by a reference number. A separate table, for example stored by the training and matching engine 102, may indicate the mapping between the reference numbers of field 402 and personal details of the corresponding record holder, such as name, address, account details etc., depending on the application.

A field 404 for example comprises a digital image of the face of the record holder, a field 406 for example comprises a digital image of the fingerprint of the record holder, a field 408 for example comprises a digital image of an iris scan of the record holder, and a field 410 for example comprises a digital image of the signature of the record holder. Of course, in alternative examples of the biometric database, only some of these fields may be present and/or addition fields comprising other biometric data could be included.

In the example of FIG. 4, not all records comprise a sample in each of the fields 404 to 410, as some of the record holders may not have provided a corresponding sample. In the example of FIG. 4, record ID2 does not comprise a fingerprint sample, and record ID3 does not comprise an iris scan.

The table of FIG. 4 also shows some examples of metadata extracted from each record, associated with each of the training biometric samples. This metadata is for example used to generate the parameter for partitioning the database based on the threshold value $M_{TH}$. The extracted metadata has an effect on the scores determined during the matching operations, and for example relates to the quality of the samples. Indeed, low quality samples generally make matching more difficult and increases the likelihood of an incorrect result.

Fields 412, 414 and 416 associated with the face photo 404 provide quality metadata values Q1, Q2, and θ respectively. In this example, Q1 is a quality value on a scale of 1 to 10 linked to the lens and image sensor quality, defined for example based on variables such as the image sharpness, contrast and saturation, which can all be measured in the digital image. The value Q2 in this example indicates the number of pixels in the image, while the value θ indicates the viewing angle of the camera with respect to a head-on view of the face, a positive angle indicating a face turned to the right, and a negative angle indicating a face turned to the left. Again, this angle is for example measured from the digital image. The fingerprint image 406, iris scan 408 and signature 410 for example each also comprise associated Q1 and Q2 quality fields 418, 420, 422, 424 and 426, 428.

Other examples of types of metadata that could be extracted from a record in relation to a sample include the age and gender of the record holder.

The training dataset may be used to determine how the records of the database 108 should be partitioned, based on the metadata extracted from each record and what matching strategy to apply to each partition. A few examples of such partitioning operations will now be provided.

In one example, the records are classified into partitions based on the particular reference biometric samples that they contain. For example, all records containing an image of a face are placed in a first partition, and all those without are placed in a second partition.

Additionally or alternatively, the database is for example partitioned based on the quality of the samples, which indicates the facility by which matching may be performed on the data. For example, it may be considered that biometric samples from record holders over 60 are of poorer quality and thus harder to analyse than samples from those under 60. In this case, all records for which the age of the record holder is over this threshold are placed in a one partition, and all those under this threshold are placed in another partition.

Additionally or alternatively, one or more properties of the image, such as image size, sharpness, viewing angle or contrast can be used as quality indicators, and used to partition the database. For example, all records having a sharpness of greater than 7 are placed in one partition, and all those with a sharpness of less than 7 are placed in another partition.

Alternatively, a quality score may be determined for each record, for example on a scale of 0 to 10, indicating an overall quality rating of the biometric sample based on the various parameters available. Such a quality score may then be used to partition the database, for example into good quality samples having scores between 6 and 10, and low quality samples having scores between 0 and 5.

In one particular example, each record of the database is classified into one of four partitions as follows, based on the presence of an iris scan and of a fingerprint, and on the quality of the fingerprint:
  partition 1: Iris scan+no fingerprint
  partition 2: Iris scan+good quality fingerprint
  partition 3: Iris scan+low quality fingerprint
  partition 4: All remaining records (no iris scan)

Once the database is partitioned, an appropriate matching process is assigned to each partition, indicating the order in which matching operations should be applied to each sample type, and the particular matching operations to be used. In this example, face characteristics are not used to partition the database.
  partition 1: 1st operation: iris; 2nd operation: face
  partition 2: 1st operation: fingerprint fast filter with restrictive threshold; 2nd operation: fingerprint; 3rd operation: iris; 4th operation: face.
  partition 3: 1st operation: fingerprint with permissive threshold; 2nd operation: Iris; 3rd operation: fingerprints; 4th operation: face.
  partition 4: 1st operation: fingerprint; 2nd operation: face.

Figure 5:
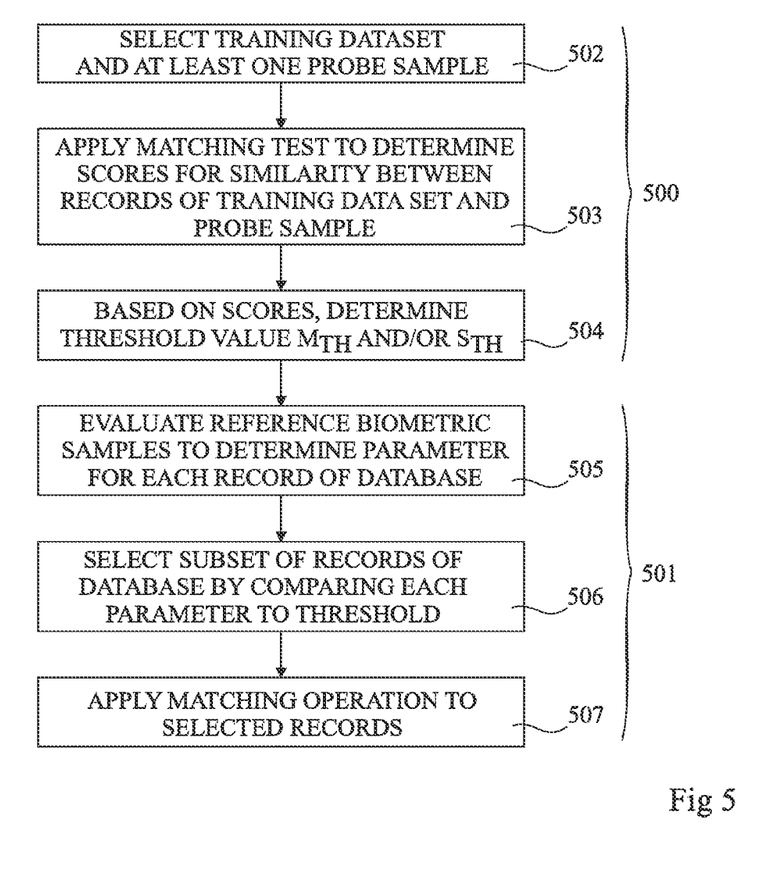
FIG. 5 is a flow diagram showing operations in a method of selecting records to be applied to a biometric matching operation using a certain matching process according to an example embodiment.

FIG. 5 is a flow diagram illustrating operations in a method of identifying a biometric record of an individual in a database according to an example embodiment. The operations are grouped into a training phase 500 and a subsequent identification phase 501.

The training phase 500 comprises a first operation 502 in which the training dataset and at least one probe sample are selected. As described above, the training dataset is for example pseudo-randomly selected among the biometric records of the database 108 of FIG. 1. This has the benefit that, when the training phase is periodically repeated, the training dataset is representative of the latest real data available in the database. This is beneficial because certain aspects of the biometric samples, such as their quality, may vary in time, for example depending on the age of the capturing devices, cleanliness of the lens, etc.

As indicated above, the probe sample is one that is different from, but is known to match, a particular biometric sample of the training dataset. The number of probe samples and training records will depend on factors such as the accuracy measurement and training precision.

In a subsequent operation 503, one or more matching operations are applied to determine scores indicating the similarity between a biometric sample of each training record and each probe sample. For example, the one or more matching operations corresponds to the matching operations 203, 203', 203" described above in relation to FIG. 2, in which no conclusion is reached regarding a match or non-match, and instead the similarity score of the matching operation is provided as the result.

In a subsequent operation 504, the threshold value or values $S_{TH}$ is/are determined based on the scores. For example, a threshold value $S_{TH}$ is chosen that permits the scores to distinguish the matching and non-matching samples. In one example, the threshold value $S_{TH}$ is a score lower than the score of any matching record. In other cases, the threshold value $S_{TH}$ is a metadata threshold used to separate the records that can be correctly evaluated by a particular matching operation. In some cases more than one threshold value $S_{TH}$ may be determined, for example a score threshold $S_{TH}$ and a metadata threshold $M_{TH}$, as will be explained in more detail below.

Once the training phase has been completed, the resulting one or more threshold values $S_{TH}$ may be applied during multiple identification operations. The one or more threshold values are for example updated periodically, or after a certain number of new biometric samples have been added to the database.

In the identification phase 501, an operation 505 involves evaluating the reference biometric samples in the database in order to determine at least one parameter for each record. For example, as described in relation to FIG. 4, the parameter could be a quality value extracted from the reference biometric samples, used to partition the database. Alternatively, the parameter is a score determined by the pre-filter operation 202, 202', 202" of FIG. 2.

In a subsequent operation 506, a subset of the records of the database is selected by comparing each parameter to the one or more metadata threshold values $M_{TH}$. For example, the records are selected as those having a metadata parameter value above the threshold $M_{TH}$, or below the threshold $M_{TH}$, or between two of the thresholds $M_{TH}$.

Then, in a subsequent operation 507, a matching operation is applied to the selected records, for example the matching operation 203, 203', 203" of FIG. 2, which is applied only to records of a given partition and/or that have not been filtered out by the corresponding pre-filter operation 202, 202', 202".

Figure 6:
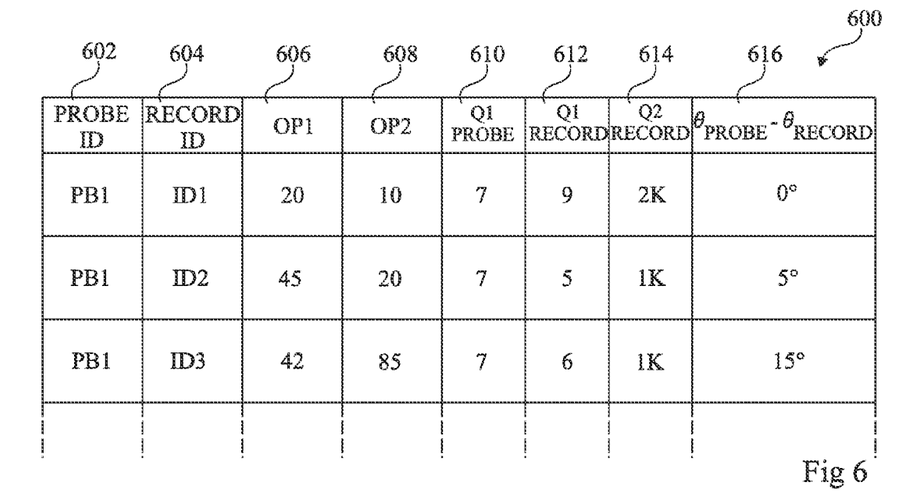
FIG. 6 illustrates a table of results of a training operation according to an example embodiment.

FIG. 6 shows a table 600 providing an example of the results generated during operation 503 of FIG. 5. The matching operation is applied between the probe sample, in this example having a reference PB1, and each of the training records, in this case having references ID1, ID2 and ID3 respectively, the results of which are shown in the rows of table 600.

A column 602 of table 600 indicates the reference of the probe sample and a column 604 indicates the reference of the training record. In this example, the probe sample PB1 is a face image, and each of the records ID1, ID2 and ID3 comprise a face record with which the probe sample is compared, and it is known to the matching engine that the probe sample matches the third training record ID3. Column 606 provides an examples of scores generated using a first matching operation OP1 applied to the pairs of face images, and column 608 provides an example of scores generated by a second matching operation OP2 applied to the pairs of face images. For example, OP1 used to generate the scores of column 606 is a fast but relatively imprecise operation, while OP2 used to generate the scores of column 608 is a slow and relatively precise matching operation. Each of the scores is for example normalized to a value between 0 and 100, where 0 indicates no similarity, and 100 indicates a perfect match.

The other columns of table 600 show quality parameters extracted from the records, which provide possible candidates for parameters that can be used for partitioning the database. For example, the quality parameters include the Q1 value of the probe in column 610, the Q1 value of training record in column 612, the Q2 value of the record 614, and a subtraction of the viewing angle of the training record sample from the viewing angle of the probe sample.

The particular parameter to be used for partitioning a database is for example determined as the parameter having the closest correlation with respect to the scores.

There are various ways in which the at least one threshold $M_{TH}$ can be determined based on the scores of the matching operations OP1, OP2 and the corresponding quality measurements. In one example, the correlation between the scores and each of the extracted metadata values is analysed in conjunction with the knowledge of whether or not each score should indicate a match. An example based on correlation between the quality parameter Q1 of the records and the score of operation OP1 will now be described in relation to FIG. 7A.

Figures 7A, 7B:
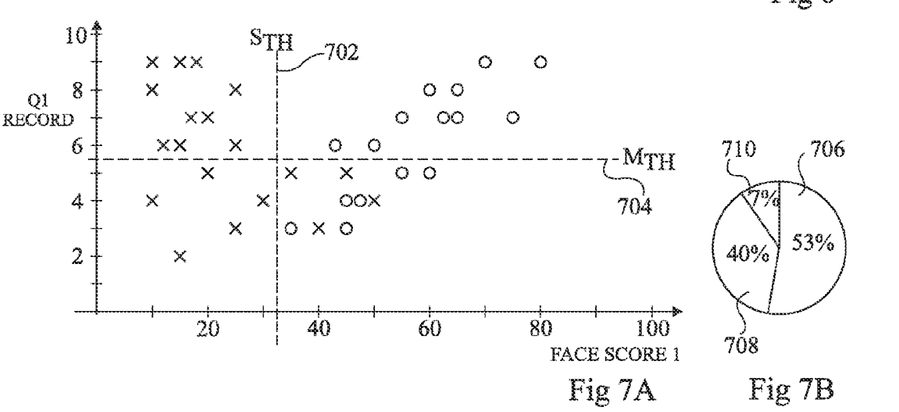
FIG. 7A is a graph showing a matching score against a quality value for matching and non-matching records according to an example embodiment.
FIG. 7B is a pie chart illustrating the partitioning of a biometric database according to an example embodiment.

FIG. 7A is a graph showing the quality parameter Q1 of the records and the score of operation OP1 according to a few examples. In the graph, the crosses represent known non-matches, while the circles represent known matches.

In order to choose a threshold value $S_{TH}$ of the score for use in one or more of the pre-filter operations 202, 202', 202" of FIG. 2, a level is for example chosen that is as high as possible, without any matches occurring below this level. In other words, a score threshold is chosen to be just lower than the scores of all of the matching records. In alternative embodiments, a different threshold selection policy could be used to determine the threshold, for example by prioritizing false non-matches over false matches. An example of such a level is shown by dashed line 702 in FIG. 702.

Additionally or alternatively, in order to choose a threshold value $M_{TH}$ for selecting records to form a partition of the database, a level of quality parameter Q1 is for example selected above which most or all of the matches and non-matches can be separated. In FIG. 7A, above a quality level represented by a dashed line 704, there is no overlap between the scores of the non-matches and matches, the crosses being positioned at relatively low scores and the circles being positioned at relatively high scores. However, below this quality level, the matches and non-matches are merged.

Thus the threshold value $M_{TH}$ is for example chosen to correspond to the level of dashed line 704. This means that all the records for which the quality parameter Q1 falls above this threshold will form a partition of the database, to which will be applied the matching operation OP1 of FIG. 6. The remaining records for example form a further partition of the database to which is applied the more precise, but for example slower, matching operation OP2 of FIG. 6.

In the case that each training record of the training dataset and each probe sample comprises more than one type of biometric sample, an order that the samples should be compared can also be determined. For example, assuming that samples of a fingerprint, iris and face exist, the first of these sample types to be analysed is for example the one that provides the best separation between the scores of matching and non-matching records. A different order may be selected for each partition of the database, thereby defining a different matching strategy for each partition.

FIG. 7B is a pie chart illustrating the partitioning of a database according to a further example embodiment in which there are three partitions. Of course, in practise there may be more partitions in the database, each being defined by a different set of rules. A partition 706 for example comprises records for which the quality parameter Q1 is greater than 5, which for example corresponds to 51 percent of the database records, a partition 708 for example comprises records for which the quality parameter is greater than 3 and less than or equal to 5, which for example corresponds to 40 percent of the database records, and the remaining 7 percent of records form a further partition 710. A different matching operation is for example applied to each of these partitions, a default matching operation being applied to each record not falling into partitions 706 or 708.

Figure 8:
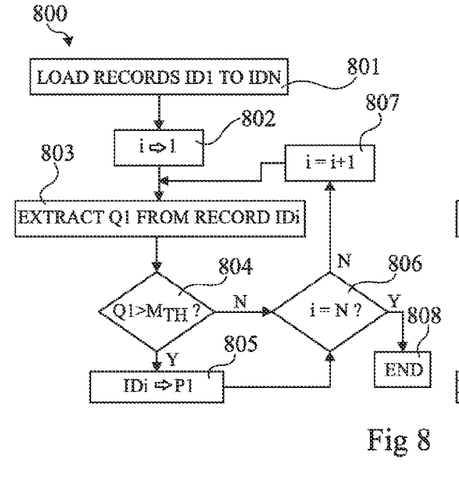
FIG. 8 is a flow diagram illustrating operations in a method of creating a database partition according to an example embodiment.

FIG. 8 is a flow diagram illustrating operations in a method of creating a database partition according to an example embodiment, for example by the training and matching engine 102 of FIG. 1. In this example, the records of the database have references ID1 to IDN.

In a first operation 801, the records ID1 to IDN are loaded to engine 102. This for example represents all of the records in the database, or the first N records from the database that are to be processed, in which case the method is for example repeated for subsequent blocks of N records until all of the database records have been processed.

In a subsequent operation 802, a variable i is initialised at "1".

In a subsequent operation 803, the quality parameter Q1 is extracted from the record IDi, which is initially ID1. Alternatively, a different parameter, or a combination of parameters could be extracted. In some cases, a quality parameter extracted from the input biometric sample $S_{Bin}$ of FIG. 1 could also be used to partition the database, in which case this operation also for example involves extracting this parameter from the input sample.

In a subsequent operation 804, it is verified whether or not Q1 is greater than the threshold value $M_{TH}$. If so, the record IDi is assigned to a partition P1 in a subsequent operation 805. If Q1 is not greater that $M_{TH}$, or after operation 805, the next operation is 806.

In operation 806, it is determined whether or not i is equal to N, the last record in the database. If not, the next operation is 807, in which the variable i is incremented, and then the method returns to operation 803. However, once i equals N, the process ends at step 808. In this way, a partition P1 is created containing all of the records of the database for which the parameter Q1 is greater than the threshold value $M_{TH}$. Further partitions of the database may be created by repeating the process on the remaining records of the database, using a new threshold value $M_{TH}$.

Once the database has been partitioned into one or more partitions, a given matching operation can be assigned to each partition. For example, it may be determined that if the input biometric sample and a reference biometric sample are a face image having a similar viewing angle, a fast filtering operation can be applied to the images with a restrictive threshold, whereas if the viewing angles are different, a slower filtering operation should be used, with a more permissive threshold. Thus the records may be partitioned based on the difference between the viewing angles of the face image.

Alternatively or additionally, the records could be classified into partitions based on a combination of the quality scores, for example by performing a multiplication of the quality score of the input biometric sample with the quality score of the corresponding records.

As another example, the following four partitions could be used:
Partition 1: $\Delta\theta<10°$; $Q_i \cdot Q_r > 50$
Partition 2: $\Delta\theta>10°$; $Q_i \cdot Q_r > 50$
Partition 3: $\Delta\theta<10°$; $Q_i \cdot Q_r < 50$
Partition 4: $\Delta\theta>10°$; $Q_i \cdot Q_r < 50$
where $\Delta\theta$ is the difference between the viewing angles of the input biometric samples and the reference biometric samples, $Q_i$ is the quality score of the input biometric reference, and $Q_r$ is the quality scores of the reference biometric samples.

The matching process assigned to each of these four partitions may use a first filtering operation having a filtering threshold adapted accordingly. For example, partition 1 may have a restrictive threshold, partitions 2 and 3 average thresholds, and partition 4 a permissive threshold.

Figure 9:
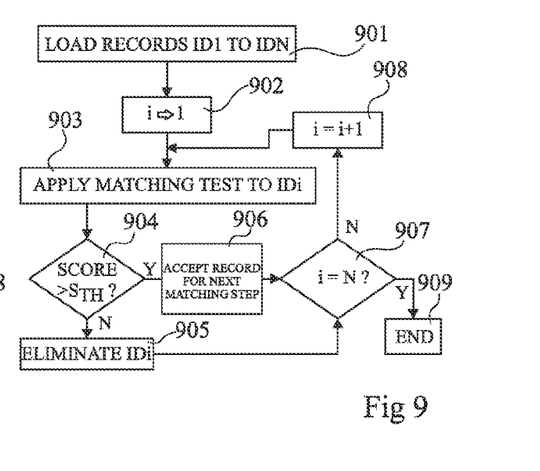
FIG. 9 is a flow diagram illustrating operations in a method of pre-filtering records according to an example embodiment.

FIG. 9 is a flow diagram illustrating operations in a method of pre-filtering records according to an example embodiment, for example corresponding to operation 201 of FIG. 2. Pre-filtering is different to partitioning, because the records of each partition are for example subject to a matching operation, whereas the records filtered out in the pre-filter operation are eliminated, and thus they are not subject to further matching operations.

In a first operation 901, records ID1 to IDN are loaded to the matching engine 102. This for example represents all of the records in the database, or the first N records from the database that are to be processed, in which case the method is for example repeated for subsequent blocks of N records until all of the database records have been processed.

In a subsequent operation 902, a variable i is initialised at "1".

In a subsequent operation 903, a matching operation is applied to the record IDi, which is initially ID1. The score from this matching operation provides a parameter value.

In a subsequent operation 904, it is verified whether or not the score of the matching operation is greater than the threshold value $S_{TH}$. If not, the record IDi is eliminated in a subsequent operation 905. If the score is greater than $S_{TH}$, or after operation 905, the next operation is 906.

In operation 906, the record IDi is accepted for a next matching operation.

After operation 906, in operation 907 it is determined whether or not i is equal to N, the last record to be processed. If not, the next operation is 908, in which the variable i is incremented, and then the method returns to operation 903. However, once i equals N, the process ends at step 909. In this way, a partition P1 is created containing all of the records of the database for which the score is greater than the threshold value $S_{TH}$.

Figure 10:
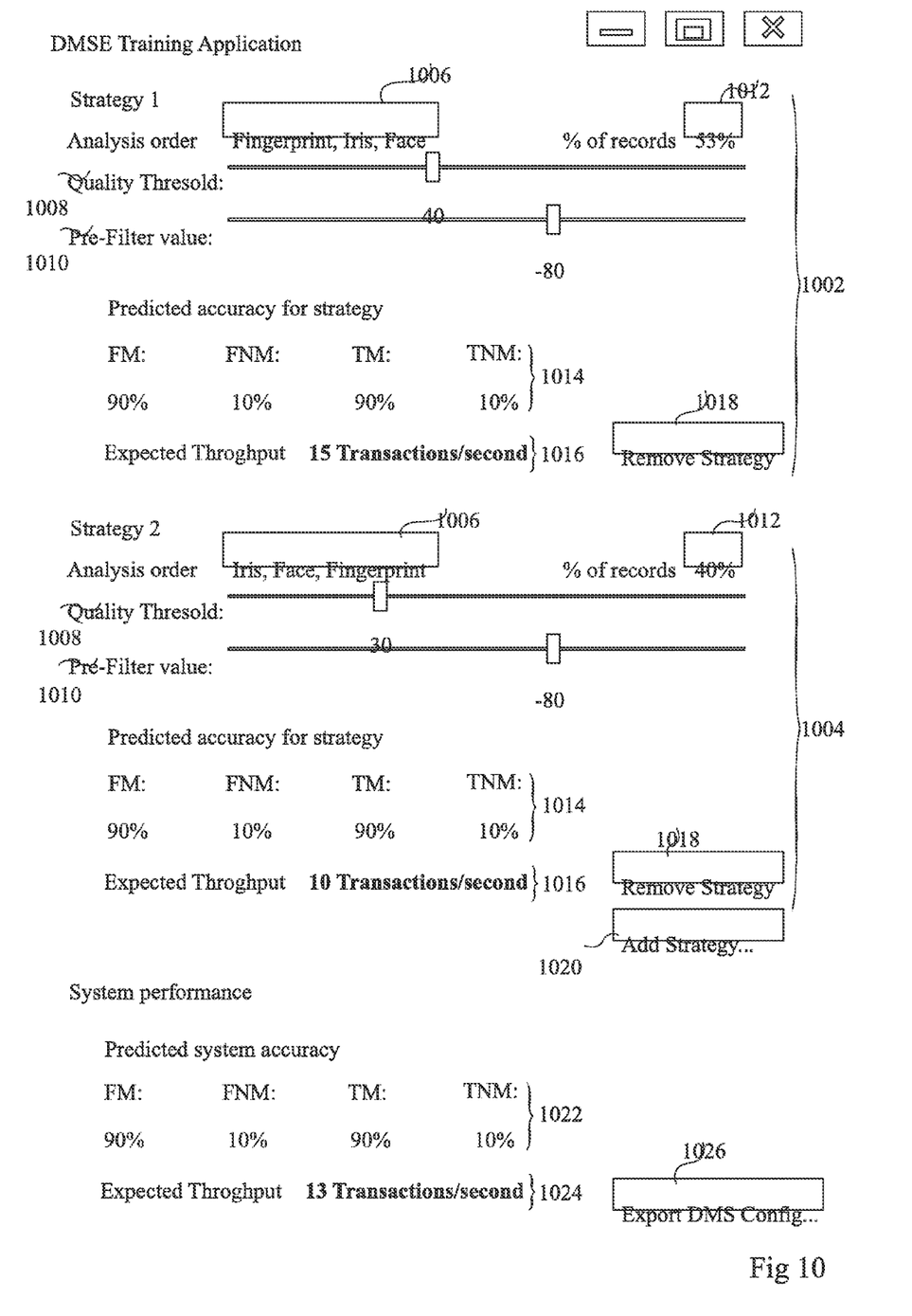
FIG. 10 illustrates a user interface display of a matching engine training application according to an example embodiment.

FIG. 10 is a screen shot of a graphical user interface (GUI) of a training application for example implemented by the training and matching engine 102 of FIG. 1 according to an example embodiment, in which database partitions, rules and matching processes are defined.

As illustrated in FIG. 10, two partitions 1002 and 1004 are for example defined, each partition having an associated strategy 1006 defining the order in which the sample types are analysed, which may be user defined, or determined by the engine 102, as described above.

In the example of FIG. 10, for each partition 1002, 1004, two threshold values are represented on sliding bars 1008 and 1010, these thresholds corresponding to a quality threshold and a score threshold of the pre-filter respectively. In this example, the quality threshold is on a scale of 0 to 100, and the pre-filter value is on a limitless scale, but the pre-filter values are for example normalized. As described above, one or both of these thresholds may be determined automatically. Alternatively, one or the other may be set by a user.

Any changes to the quality threshold 1008 automatically induce a corresponding change in the percentage of records falling within each partition 1002, 1004, as shown in a box 1012. A change to the pre-filter score threshold 1010 may change the number of false matches (FM), false non-matches (FNM); true matches (TM) and true non-matches (TNM), which are displayed as a percentage for each partition in a region 1014.

A value 1016 for each partition indicates the throughput for the matching operations used on each partition, in this example 15 transactions/second for partition 1002 and 10 transactions/second for partition 1004. A transaction for example corresponds to a matching operation based on one probe biometric sample and the N reference biometric samples of the biometric database. This data is for example evaluated by timing the training phase for a given number of sample probes and training records, and determining the throughput of the biometric database 108 accordingly.

A button 1018 allows a strategy, in other words a partition, to be removed, meaning that the records of this partition will be classified in another partition or in a default partition. A button 1020 allows strategies i.e. new partitions, to be defined.

The overall system performance is for example also indicated as the overall number of FM, FNM, TM and TNM records as shown in a region 1022, and the average number of transactions per second 1024.

A button 1026 permits the dynamic matching strategies (DMS) settings to be exported from the training application, for example such that these settings are used for the whole biometric database.

A feature of the example embodiments described herein is that the records to be applied to a matching process are selected by determining a threshold value such that relatively high speed and precision of the matching process is achieved.

While a number of specific embodiments of devices and methods of the present disclosure have been provided above, it will be apparent to those skilled in the art that various modifications and alternatives could be applied.

For example, it will be apparent to those skilled in the art that the examples of matching processes applied to the records of the database partitions are merely a few such examples, and that other matching processes could be used.

Furthermore, it will be apparent to those skilled in the art that other criteria could be used to partition the database of biometric records.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
    applying, by a processing device, a first matching operation to determine scores for a similarity between at least one training biometric sample, of each of a plurality of training records, and at least one probe sample;
    determining, by the processing device and based on the scores, a threshold value;
    evaluating at least one reference biometric sample of each biometric record, of a plurality of biometric records of a database, to determine a parameter value for each biometric record of the plurality of biometric records;
    selecting a subset of the plurality of biometric records by comparing the parameter value, determined for each biometric record of the plurality of biometric records, with the threshold value; and
    applying a second matching operation to the selected subset of the plurality of biometric records to determine whether an input biometric sample matches a reference biometric sample of one biometric record of the selected subset of the plurality of biometric records.

2. The method of claim 1, where determining the threshold value includes evaluating a correlation between the scores and at least one parameter value of each training record of the plurality of training records.

3. The method of claim 1, further comprising:
evaluating a plurality of parameter values for each training record of the plurality of training records; and
selecting one or more parameter values, of the plurality of parameter values, to be compared with the threshold value.

4. The method of claim 1, further comprising:
evaluating the at least one training biometric sample, of each training record of the plurality of training records, to determine a value of a parameter for each training record of the plurality of training records,
the threshold value being determined as a parameter value that allows known matching and non-matching samples to be separated.

5. The method of claim 4, where the parameter provides a quality indication of the at least one training biometric sample.

6. The method of claim 5, where the parameter is based on one or more of:
an age of an individual of the at least one training biometric sample;
a gender of the individual of the at least one training biometric sample;
a sharpness of an image of the at least one training biometric sample;
a viewing angle of an image of the at least one training biometric sample; or
a contrast in an image of the at least one training biometric sample.

7. The method of claim 1, where selecting the subset of the plurality of biometric records comprises:
creating a first partition of the database comprising the selected subset of the plurality of biometric records,
the method further comprising creating at least one further partition of the database comprising remaining records of the database.

8. The method of claim 7, further comprising:
applying a further matching operation to the remaining records, of the at least one further partition of the database, to determine whether the input biometric sample matches a reference biometric sample of one of the remaining records of the at least one further partition of the database.

9. The method of claim 1, where each of the plurality of training records comprises a plurality of training samples of different types, and
where the method further comprises determining, based on the scores, an order that the first matching operation is applied to the plurality of training samples of different types.

10. The method of claim 1, further comprising:
pseudo-randomly selecting the plurality of training records from the plurality of biometric records of the database.

11. A non-transitory computer readable medium storing instructions, the instructions comprising:
one or more instructions which, when executed by a processor, causes the processor to:
apply a matching operation to determine scores for a similarity between at least one training biometric sample, of each of a plurality of training records, and at least one probe sample;
determine, based on the scores, a threshold value;
evaluate at least one reference biometric sample of each biometric record, of a plurality of biometric records of a database, to determine a parameter value for each biometric record of the plurality of biometric records;
compare the parameter value, determined for each biometric record of the plurality of biometric records, with the threshold value to select a subset of the plurality of biometric records; and
apply a matching operation to the selected subset of the plurality of biometric records to determine whether an input biometric sample matches a reference biometric sample of one biometric record of the selected subset of the plurality of biometric records.

12. A biometric matching device comprising:
a database storing a plurality of biometric records;
a memory storing a plurality of training records,
each of the plurality of training records comprising at least one training biometric sample and at least one probe sample; and
a processor configured to:
apply, during a training phase, a matching operation to determine scores for a similarity between the at least one training biometric sample of each of the plurality of training records and at least one probe sample,
determine, based on the scores, a threshold value,
evaluate, during an identification phase, at least one reference biometric sample of each of the plurality of biometric records to determine a parameter value for each biometric record of the plurality of biometric records,
select a subset of the plurality of biometric records by comparing the parameter value, determined for each biometric record of the plurality of biometric records, with the threshold value, and
apply a matching operation to the selected subset of the plurality of biometric records to determine whether an input biometric sample matches a reference biometric sample of one biometric record of the selected subset of the plurality of biometric records.

13. The biometric matching device of claim 12, where, when determining the threshold value, the processor is configured to evaluate a correlation between the scores and at least one parameter value of each record.

14. The biometric matching device of claim 12, where the processor is further configured to create a first partition of the database comprising the selected subset of the plurality of biometric records, and to create at least one further partition of the database comprising remaining records of the plurality of biometric records of the database.

15. A biometric matching system comprising:
one or more biometric capturing devices to capture at least one biometric sample of an individual; and
a biometric matching device comprising:
a database to store a plurality of biometric records;
a memory to store a plurality of training records,
each of the plurality of training records comprising at least one training biometric sample; and
a processor to:
apply, during a training phase, a matching operation to determine scores for a similarity between the at least one training biometric sample, of each of the plurality of training records, and at least one probe sample,
determine, based on the scores, a threshold value,
evaluate, during an identification phase, at least one reference biometric sample of each of a plurality of biometric records, of the database, to determine a parameter value for each biometric record of the plurality of biometric records, compare the parameter value, determined for each of the plurality of biometric records, with the threshold value to select a subset of the plurality of biometric records, and apply a matching operation to the selected subset of the plurality of biometric records to determine whether the at least one biometric sample matches a reference biometric sample of one biometric record of the selected subset of the plurality of biometric records.

16. The biometric matching system of claim 15, where the plurality of training records is pseudo-randomly selected from the plurality of biometric records.

17. The biometric matching system of claim 15, where the processor is further to:

apply a further matching operation to remaining records, of the database, to determine whether the at least one biometric sample matches a reference biometric sample of one of the remaining records of the database.

18. The non-transitory computer readable medium of claim 11, where the instructions further comprise:

one or more instructions to pseudo-randomly select the plurality of training records from the plurality of biometric records.

19. The non-transitory computer readable medium of claim 11, where the instructions further comprise:

one or more instructions to apply a further matching operation to remaining records, of the database, to determine whether the at least one biometric sample matches a reference biometric sample of one of the remaining records of the database.

20. The non-transitory computer readable medium of claim 11, where the instructions further comprise:

one or more instructions to evaluate the at least one training biometric sample, of a particular training record of the plurality of training records, to determine a value of a parameter for the particular training record, where the parameter provides a quality indication of the at least one training biometric sample of the particular training record.

* * * * *